United States Patent
Patinier et al.

(10) Patent No.: US 9,303,231 B2
(45) Date of Patent: Apr. 5, 2016

(54) METHOD FOR CONTINUOUSLY ENRICHING AN OIL PRODUCED BY MICROALGAE WITH ETHYL ESTERS OF DHA

(71) Applicant: ROQUETTE FRERES, Lestrem (FR)

(72) Inventors: Samuel Patinier, Quesnoy-sur-Deule (FR); Philippe Looten, Lomme (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 14/403,611

(22) PCT Filed: May 28, 2013

(86) PCT No.: PCT/FR2013/051186
§ 371 (c)(1),
(2) Date: Nov. 25, 2014

(87) PCT Pub. No.: WO2013/178936
PCT Pub. Date: Dec. 5, 2013

(65) Prior Publication Data
US 2015/0159116 A1    Jun. 11, 2015

(30) Foreign Application Priority Data

May 29, 2012    (FR) ...................................... 12 54942

(51) Int. Cl.
| | | |
|---|---|---|
| *C11C 3/10* | (2006.01) |
| *A23D 9/00* | (2006.01) |
| *F27B 9/14* | (2006.01) |
| *C11B 3/12* | (2006.01) |
| *A23L 1/30* | (2006.01) |
| *C11B 1/02* | (2006.01) |
| *A23D 9/013* | (2006.01) |

(52) U.S. Cl.
CPC . *C11B 3/12* (2013.01); *A23D 9/013* (2013.01); *A23L 1/3006* (2013.01); *A23L 1/3008* (2013.01); *C11B 1/025* (2013.01)

(58) Field of Classification Search
CPC .......... C11B 3/12; C11B 1/025; A23D 9/013; A23L 1/3006; A23L 1/3008
USPC .................................. 554/169, 224; 435/134
See application file for complete search history.

(56) References Cited

U.S. PATENT DOCUMENTS

| | | | |
|---|---|---|---|
| 2006/0286266 A1* | 12/2006 | Saebo et al. ................... | 426/604 |
| 2011/0091947 A1 | 4/2011 | Kim et al. | |
| 2011/0098356 A1* | 4/2011 | Leininger et al. ............. | 514/549 |

FOREIGN PATENT DOCUMENTS

| | | |
|---|---|---|
| WO | WO 00/73254 | 12/2000 |
| WO | WO 0073254 A1 * | 12/2000 |
| WO | WO 2011/161702 | 12/2011 |
| WO | WO 2011161702 A1 * | 12/2011 |
| WO | WO 2013/013210 | 1/2013 |

OTHER PUBLICATIONS

Arne Pietsche et al : "Concentration of squalene from shark liver oil by short-path distillation"; European Journal of Lipid Science and Technology vol. 109 , No. 11 , Nov. 1, 2007, pp. 1077-1082.*
Breivik, H. et al., "Preparation of Highly Purified Concentrates of Eicosapentaenoic Acid and Docosahexaenoic Acid," *Journal of the American Oil Chemists' Society*, Nov. 1, 1997, pp. 1425-1429, vol. 74, No. 11.
Breivik, H., "Chapter 5 Concentrates, Long-Chain Omega-3 Specialty Oils," *Oily Press Lipid Library*, Jan. 1, 2007, pp. 111-140, Bridgwater: Oily Press.
Pietsch, A. et al., "Concentration of squalene from shark liver oil by short-path distillation," *Eur. J. Lipid Sci. Technol.*, Nov. 1, 2007, pp. 1077-1082, vol. 109, No. 11.
Valverde, M. et al., "Concentration of Docosahexaenoic Acid (DHA) by Selective Alcoholysis Catalyzed by Lipases," *J. Am. Oil Chem Soc*, Apr. 3, 2012, pp. 1633-1645, vol. 89, No. 9.

* cited by examiner

*Primary Examiner* — Deborah D Carr
(74) *Attorney, Agent, or Firm* — Saliwanchik, Lloyd & Eisenschenk

(57) ABSTRACT

The invention concerns a method of preparing an oil enriched with ethyl esters of DHA produced by fermenting microorganisms, characterized in that it comprises a step of purification by so-called "short path" molecular distillation.

9 Claims, No Drawings

METHOD FOR CONTINUOUSLY ENRICHING AN OIL PRODUCED BY MICROALGAE WITH ETHYL ESTERS OF DHA

CROSS-REFERENCE TO RELATED APPLICATION

This application is the U.S. national stage application of International Patent Application No. PCT/FR2013/051186, filed May 28, 2013.

The present invention relates to a continuous process which makes it possible, industrially, to obtain an oil rich in an ethyl ester of a natural fatty acid from a microalgae: docosahexaenoic acid or DHA.

More particularly, the present invention relates to the production of an oil rich in an ethyl ester of DHA from a microalgae-derived oil, which initially:
is moderately rich in DHA and
contains a high amount of unsaponifiable compounds, essentially consisting of squalene.

For the purposes of the invention, the term "microalgae-derived oil" is intended to mean an oil extracted from microalgae of the *Thraustochytriales* sp. family.

For the purposes of the invention, the expression "microalgae of the *Thraustochytriales* sp. family" is intended to mean microalgae belonging to the species *Schizochytrium* sp., *Autantiochytrium* sp. and *Thraustochytrium* sp.

For the purposes of the invention, the term "oil moderately rich in DHA" is intended to mean an oil containing from 30% to 45% of DHA by mass of total fatty acids (in the interests of simplification, the term "weight" of total fatty acids is used).

For the purposes of the invention, the expression "oil which contains a high amount of unsaponifiable compounds, essentially consisting of squalene" is likewise intended to mean an oil containing about 10% to 30% by weight of unsaponifiable compounds, including 15% to 25% of squalene.

Finally, the expression "enrichment of an oil with an ethyl ester of DHA derived from microalgae" is intended to mean a process which makes it possible to increase the DHA content of the oil by a factor of 1.5 to 2, in this case to go from an initial DHA content of between 30% and 45% of DHA by weight of total fatty acids to an oil which has a DHA ethyl ester content of between 60% and 70% of DHA by weight of total fatty acids.

Lipids constitute one of the three major families of macronutrients along with proteins and carbohydrates.

Among the lipids, triglycerides and phospholipids are in particular distinguished.

Triglycerides represent approximately 95% of ingested food lipids. In the organism, they are present mainly in adipose tissues and constitute the main form of energy storage.

Phospholipids are structural lipids since they are constituents of cell membranes of which they provide, inter alia, the fluidity.

Triglycerides and phospholipids are composed predominantly of fatty acids which are both provided by the diet and, for some of them, synthesized by the organism.

The dietary sources of "essential" polyunsaturated fatty acids are vegetable oils (namely omega 6 and omega 9 fatty acids) and fish oils, which contain in particular large amounts of omega 3 fatty acids.

Polyunsaturated fatty acids are classified according to the position of the first double bond, starting from the final methyl function.

Thus, in the nomenclature, for omega "x" or "nx", "x" corresponds to the position of the first unsaturation.

The majority of polyunsaturated fatty acids of biological interest belong to the omega 6 (arachidonic acid or ARA) or omega 3 (eicosapentaenoic acid or EPA, docosahexaenoic acid or DHA) family.

In addition, in the nomenclature, the number of carbons constituting the chain is also defined: thus, EPA is described as C20:5 and DHA as C22:6.

The "5" and "6" thus correspond to the number of unsaturations of the carbon chain which are exhibited respectively by EPA and by DHA.

DHA, of the omega 3 fatty acid family, is a fatty acid which the organism can synthesize from alpha-linolenic acid, or which is provided by the consumption of fatty fish (tuna, salmon, herring, etc.).

DHA plays an important role in membrane structure and in brain and retina development and function.

Fish oils are used mainly as a source of omega 3-type fatty acids, such as DHA and EPA, but they are also found in the oils of microalgae, from which they are extracted either as a mixture, or separately, as is the case, for example, with the oils derived from certain selected strains, such as those of the *Schizochytrium* genus, which contain only traces of EPA, but have high DHA contents.

The conventional methods for enriching fish oils with DHA and/or EPA are based on the selectivity with respect to the chain length of the constituent fatty acids of the oils or their degree of unsaturation.

It is first of all necessary to separate the fatty acids linked to the glyceride backbone in order to be able to subsequently isolate the DHA and/or EPA chains.

This operation of separating the fatty acids from the glycerol chain is carried out by ethanolic transesterification (ethanolysis).

The enrichment processes most commonly subsequently used, implemented for fatty acids as such or on their esters, are:
crystallization,
countercurrent extraction,
molecular distillation, or
preparative chromatography.

Usually, various processes are combined in order to obtain a strong enrichment.

However, these processes have the following drawbacks:
high-temperature enrichment processes give rise to thermal degradation of the fatty acids (isomerization, peroxidation, oligomerization);
the drawback of the chromatography techniques remains the use of large amounts of solvents which are often toxic.

In addition, large-scale production using these techniques is far from easy.

For these reasons, alternative methods have been developed and studied, said methods being based on the use of supercritical fluids, in particular by means of fractionation processes with supercritical $CO_2$.

A step prior to the enrichment of fish oils with DHA and/or EPA using supercritical $CO_2$ is the transesterification of the fatty acids, using methanol or ethanol.

The process of fractionating ethyl esters of fatty acids using supercritical $CO_2$ has, for example, been thoroughly described in the literature.

However, it should be noted that the majority of the processes cited describe especially the joint enrichment with ethyl esters of EPA and of DHA, and not DHA only.

Moreover, the vast majority of these processes:
are batchwise processes,
use excessively large amounts of supercritical fluid, have a low yield,
and, finally, have a low productivity.

Moreover, the 100° C. temperature applied in the columns in numerous cases can cause fatty acid degradation.

The pressures applied are also too strong, and reducing them results directly in increased consumption of supercritical $CO_2$.

In other words, these processes are not usable on an industrial scale under economically viable conditions.

A process for enriching fish oil with ethyl esters of EPA and of DHA is, for example, described in patent application JP 2005-255971.

The temperature and pressure ranges are respectively from 35 to 200° C. and from $100 \times 10^5$ Pa to $500 \times 10^5$ Pa.

The authors recommend two successive extractions with a view to obtaining high contents.

A first extraction is carried out on the raw material, and a second extraction is carried out on the residue from the first operation.

The column used is 3 m high with a diameter of 50 mm. It comprises 6 distinct heating chambers.

The levels of solvent, defined as the ratio of the flow rate of supercritical $CO_2$ to the flow rate of treated oil, that are used to obtain high DHA percentages remain high.

These two successive extractions also complicate the process and make it industrially inapplicable.

It appears, on reading these elements, that the choice of the technology of enrichment of oils with fatty acids using supercritical fluid is preferred, but still requires optimization studies.

As mentioned above, another source of omega 3 fatty acids is microalgae.

However, the situation is much more complex in the field of oils than microalgae since there are other additional difficulties, which are linked to the presence of unsaponifiable compounds in oils from microalgae.

Thus, while the transesterification operation commonly carried out on fish oils poses no major technical problems, it becomes problematic for oils from microalgae, since the transesterification of the crude oils is virtually impossible from a practical point of view on a large scale.

This technical impossibility is linked to the presence, at variable but often high contents, of unsaponifiable compounds, such as squalene.

Consequently, significant losses of exploitable compounds are criticized.

Squalene is a polyunsaturated hydrocarbon of pharmaceutical, cosmetological and dietetic interest, present in particular in oils from microalgae.

It is found therein at variable contents which are sometimes high, exceeding 15% by mass in certain selected strains, such as those of the *Schizochytrium* genus.

In the prior art, it is known that squalene can be separated from lipids, consisting essentially of triglycerides, for example by molecular distillation, but at the expense of several successive steps if the intention is to extract the squalene from the oil and to produce an oil subsequently containing only traces of squalene.

Since all the constituents of oils from microalgae are particularly sensitive to heat, this method must be carried out conventionally under a very strong vacuum, requiring equipment with a very large volume given the very low productivity thereof.

It is therefore advisable to propose other approaches:
  which are more efficient, if it is desired to use molecular distillation, than the operations conventionally implemented, or
  which operate at a moderate temperature and guarantee the protection of the unsaturated products, which are very unstable to oxidation, against any contact with air, while at the same time being readily industrializable up to processing capacities of hundreds or thousands of metric tonnes of oil treated per year.

To the knowledge of the applicant company, no efficient and industrializable process for enriching oils with ethyl esters of DHA using microalgae, by means of molecular distillation technology, is currently accessible to those skilled in the art.

Concerned with developing an efficient process for enrichment of DHA produced by microalgae, the applicant company has developed its own research and has succeeded in adapting molecular distillation technology so as to guarantee an enrichment with DHA of more than double the content of the initial oil.

The present invention therefore relates to a process for preparing an oil enriched with ethyl esters of DHA produced by fermenting microorganisms, characterized in that it comprises a step of purification by "short path" molecular distillation.

The microorganisms are preferentially microalgae belonging to the *Thraustochytriales* sp. family, even more preferentially microalgae belonging to the species *Schizochytrium* sp., *Aurantiochytrium* sp. and *Thraustochytrium* sp.

Implementation of Molecular Distillation

In this process for preparing an oil enriched with ethyl esters of DHA in accordance with the invention, a process is implemented which is characterized in that it comprises the following steps:

1) preparing a crude oil containing a mixture of DHA-rich triglycerides and unsaponifiable compounds composed essentially of squalene, from a fermentation of microalgae of the *Thraustochytriales* family,
2) optionally refining the resulting crude oil by a series of degumming, deacidifying, discoloring and deodorizing steps,
3) extracting the squalene by "short path" molecular distillation so as to obtain a raffinate freed of the squalene,
4) transesterifying the resulting raffinate by alcoholic transesterification in the presence of a basic or enzymatic catalyst, preferably an enzymatic catalyst,
5) fractionating the mixture of fatty acid esters in step 4) by "short path" molecular distillation, so as to obtain an extract rich in short-chain fatty acid esters and a raffinate very rich in long-chain fatty acid esters,
6) purifying the mixture of long-chain fatty acid esters obtained during step 5) by "short path" molecular distillation, so as to obtain an extract very rich in long-chain esters freed of its impurities,
7) optionally, refining this extract very rich in long-chain esters fraction by a series of discoloring and deodorizing steps, and
8) collecting the resulting compound enriched with ethyl esters of DHA.

The first step of this process in accordance with the invention consists of preparing a crude oil containing a mixture of DHA-rich triglycerides and unsaponifiable compounds composed essentially of squalene, from a fermentation of microalgae of the *Thraustochytriales* family.

As microalgae belonging to the *Thraustochytriales* family, the following strains are, for example, commercially available:
  *Schizochytrium* sp. referenced ATCC 20888, and
  *Aurantiochytrium* sp. referenced ATCC PRA 276.

Moreover, the applicant company also has its own production strain, a *Schizochytrium* sp. deposited on Apr. 14, 2011, in France, with the Collection Nationale de Cultures de Microorganismes [National Collection of Microorganism Cultures] of the Institut Pasteur under CNCM No. I-4469 and also deposited in China with the CHINA CENTER FOR TYPE CULTURE COLLECTION of Wuhan University, Wuhan 430072, P.R. China under No. M 209118.

The culturing is carried out under heterotrophic conditions. Generally, the culturing step comprises a preculturing step, to revive the strain, and then a step of actual culturing or fermentation. This last step corresponds to the step for producing the lipid compounds of interest.

The conditions for culturing these microalgae are well known in the field. The biomass is then treated so as to obtain a crude oil containing a mixture of DHA and of unsaponifiable compounds composed essentially of squalene.

These treatments can be carried out by any method known, moreover, to those skilled in the art.

It makes it possible to obtain a crude oil consisting of glycerides (mainly triglycerides) and unsaponifiable compounds (mainly squalene) and optionally of free fatty acids and of phospholipids in lower proportions. As will be exemplified hereinafter, the content of DHA of between 30% and 45% by weight of total fatty acids, and of unsaponifiable compounds of between 10% and 30% by weight, including 15% to 25% of squalene, can be easily obtained from the CNCM I-4469 strain described above.

The second step of this process in accordance with the invention consists of optionally refining the resulting crude oil via a series of degumming, deacidifying, discoloring and deodorizing steps.

The squalene-rich crude oil thus undergoes, coarse refining before extraction of the squalene.

One or more of the following steps can be envisioned:
  Degumming: removal of the phospholipids by precipitation in an acidic medium,
  Deacidifying: neutralization of the free fatty acids using a base. The use of molecular distillation for removing the free fatty acids should, it appears, be forbidden in order to avoid entrainment of the squalene,
  Discoloring: by treatment with active carbon, and
  Deodorizing (vacuum distillation, steam stripping, etc.).

These refining steps are steps commonly used by specialists in the field of vegetable oil refining.

The third step of this process in accordance with the invention consists of extracting the squalene by "short path" molecular distillation so as to obtain a raffinate free of the squalene.

The squalene of the crude (or partially purified) oil is extracted by molecular distillation.

For a vacuum of less than 0.1 mbar, the boiling point of the squalene is about 200° C.

The high vacuum makes it possible to limit the temperature and thus to limit the risks of degradation/polymerization of the squalene and of the polyunsaturated fatty acids.

The applicant company has found that it is important to adjust the residence time on this equipment to a very short time, of less than one minute. Generally in the present application, it is preferably understood that the "short path" means a contacting time of less than 1 minute.

From the nitrogen-inerted feed reservoir, the oil is thus pumped through a first circuit thermostated in a range of 25 to 150° C. to the degasser (removal of the traces of water and solvent).

At the outlet of the degasser, the oil is pumped into the ("short path" evaporation chamber to a circuit thermostated in a temperature range of 50 to 150° C., preferably from 100 to 140° C., in particular approximately 120° C.

The temperature of the evaporator is adjusted in a range of 150 to 250° C., preferably from 200 to 240° C., in particular approximately 220° C.

The condenser is adjusted in a temperature range of 0 to 50° C., preferably between 10 and 30° C., in particular approximately 20° C.

The pressure in the evaporation chamber is adjusted to a high vacuum of less than $10^{-2}$ mbar, preferably less than $10^{-3}$ mbar.

The distillate containing predominantly the squalene and the residue containing predominantly the triglycerides are conveyed, via the collection circuits, to the inerted storage tanks.

The squalene content in the raffinate is less than 5%, preferably less than 2%.

The removal of the squalene makes it possible to obtain a purified fraction of interest (DHA-rich triglycerides) (the raffinate) which can then enter the chaining of operations for enriching with DHA in the form of ethyl esters.

This raffinate has an amino acid profile containing about 40% by weight of DHA.

The fourth step of this process in accordance with the invention consists of transesterifying the resulting raffinate by alcoholic transesterification in the presence of a basic or enzymatic catalyst, preferably an enzymatic catalyst.

In order to enable the enrichment with DHA, it is necessary to separate the fatty acids linked to the glyceric backbone in order to be able to subsequently isolate the DHA chains.

This operation of separating the fatty acids from the glycerol chain is preferentially carried out by enzymatic ethanolic transesterification (ethanolysis).

This conversion is accompanied by a release of glycerol.

The enzymatic ethanolysis is carried out in a batchwise operation with the commercial enzyme N 435 (*Candida antarctica*) from Novozymes at 50° C. with ethanol in stoichiometric proportions.

Under these conditions, a degree of conversion greater than 90% is obtained in approximately 8 h of reaction.

At the end of the reaction, the fatty acids are predominantly distributed in the fraction converted into ethyl esters (more than 90%), the rest having remained in the form of residual glycerides (mono-di-triglycerides).

Before carrying out the fractionation of the ethyl esters, the reaction mixture at the end of enzymatic conversion undergoes a filtration step in order to extract the enzyme.

The glycerol is separated by settling out or centrifugation. The mixture can also be washed with water in order to remove the residual glycerol.

If the residual concentration of ethanol is high, the latter can be removed by evaporation under vacuum.

The fifth step of this process in accordance with the invention consists of fractionating the mixture of fatty acid esters obtained in step 4) by "short path" molecular distillation, so as to obtain an extract rich in short-chain fatty acid esters and a raffinate very rich in long-chain fatty acid esters.

The mixture of ethyl esters obtained as described in step 4 has a fatty acid profile corresponding to the starting oil and therefore including fatty acids other than the DHA of interest.

The objective of the fractionating operation is to remove the maximum amount of fatty acids having a chain shorter than (<C 22) DHA.

The distillation technology used to carry out this operation exploits the difference in volatility of the ethyl esters (which depends on their molecular weight and on the length of their aliphatic chain).

As explained above, the high vacuum and also the very short residence time with this technology (less than one minute) make it possible to limit the temperature and thus to limit the risks of degradation/polymerization of the polyunsaturated fatty acids.

For a vacuum of less than 0.1 mbar, the boiling point of the ethyl esters is generally in a range of temperatures below 250° C.

This operation is in reality carried out in two steps:
- the first step of molecular distillation is the fractionation as such, the objective being to separate the "short-chain" ethyl ester fraction in order to concentrate the residue with respect to polyunsaturated fatty acids, and
- the second step is instead a purification step, in the sense that the ethyl esters concentrated with respect to polyunsaturated fatty acids are separated from the heavy impurities (residual glycerides, sterols, pigments, unsaponifiable compounds, etc.).

From the nitrogen-inerted feed reservoir, the mixture resulting from the ethanolysis is sent through a first circuit thermostated in a range of 25 to 100° C. to the degasser (removal of the traces of ethanol), for example from 70 to 100° C., in particular approximately 100° C.

At the outlet of the degasser, the oil is pumped into the "short path" evaporation chamber through a circuit thermostated in a temperature range of from 50 to 100° C., for example from 70 to 90° C., in particular approximately 85° C.

The pressure in the evaporation chamber is adjusted to a high vacuum of less than $10^{-2}$ mbar, preferably less than $10^{-3}$ mbar.

The condenser is adjusted in a temperature range of 0 to 50° C., preferably between 10 and 30° C., in particular approximately 20° C.

The temperature of the evaporator is adjusted in a range of 100 to 200° C., preferably between 100 and 150° C., in particular approximately 110° C.

The temperature is adjusted so as to obtain a raffinate/distillate weight ratio corresponding to the theoretical prediction allowing a separation optimizing purity and yield of polyunsaturated fatty acids.

The distillate, containing predominantly the "short-chain" ethyl esters, and the raffinate containing predominantly the "long-chain" ethyl esters and also the impurities, are conveyed via the collection circuits to the inerted storage tanks.

The DHA ethyl ester content (weight percentage) in the raffinate is greater than 45%, preferably greater than 50%.

The DHA content in the distillate is less than 20%, preferably less than 10%.

The sixth step of this process in accordance with the invention consists of purifying the mixture of long-chain fatty acid esters obtained during step 5) by "short path" molecular distillation, so as to obtain an extract very rich in long-chain esters, free of impurities.

From the nitrogen-inerted feed reservoir, the raffinate obtained at the end of step 5) is sent through a first circuit thermostated in a range of 25 to 100° C. to the degasser, preferably from 70 to 100° C. in particular approximately 100° C.

At the outlet of the degasser, the oil is pumped into the "short path" evaporation chamber through a circuit thermostated in a temperature range of 50 to 150° C., for example from 70 to 90° C., in particular approximately 85° C.

The pressure in the evaporation chamber is adjusted to a high vacuum of less than $10^{-2}$ mbar, preferably less than $10^{-3}$ mbar.

The condenser is adjusted in a temperature range of 0 to 50° C., preferably between 10 and 30° C., in particular approximately 20° C.

The temperature of the evaporator is adjusted in a range of 100 to 250° C., preferably between 180 and 220° C., in particular approximately 200° C. The temperature is adjusted so as to obtain a residue/distillate weight ratio corresponding to the theoretical prediction allowing efficient separation of the impurities.

The distillate, containing predominantly the purified "long-chain" ethyl esters, and the residue containing the impurities, is conveyed via the collection circuits to the inerted storage tanks.

The DHA ethyl ester content (weight percentage) in the distillate is greater than 50%, preferably greater than 55%.

The DHA content in the residue is less than 30%, preferably less than 20%. The residue thus concentrates the impurities (unsaponifiable compounds, residual glycerides, pigments, etc.).

The seventh step of this process in accordance with the invention consists inof optionally refining this extract very rich in long-chain esters fraction via a series of discoloring and deodorizing steps.

Although purified during the sixth step, the extract of ethyl esters enriched with DHA can undergo additional refining if necessary, consisting of a discoloring step and a deodorizing step:
- a discoloring step in order to reduce the yellowish coloration.

This discoloring step is carried out on a discoloring earth such as active carbon in a manner similar to the discoloring conventionally used in refining vegetable oil; and
- a deodorizing step, carried out by steam stripping under vacuum.

The eighth step of this second preferential mode of the process in accordance with the invention consists finally of collecting the resulting composition enriched with ethyl esters of DHA.

The ethyl esters of DHA thus purified are stored under a controlled atmosphere (inerted ideally with nitrogen).

An addition of antioxidants can be favorable to the stabilization of this fraction.

The present invention also relates to the use of the composition enriched with ethyl esters of DHA which is obtained by means of the process according to the present invention in the food sectors.

The invention will be understood more clearly by means of the examples which follow, which are intended to be illustrative and nonlimiting.

EXAMPLE 1

Preparation of an Oil Containing Between 30% and 45% of DHA by Weight of Total Fatty Acids and Between 10% and 30% by Weight of Unsaponifiable Compounds, Including 15% to 25% of Squalene, from the *Schizochytrium* Spp CNCM I-4469 Strain This example illustrates the process for obtaining a crude oil containing a mixture of DHA and of unsaponifiable compounds, consisting essentially of squalene, produced by fermenting the microalgae *Schizochytrium* sp. belonging to the applicant company (deposited on Apr. 14, 2011, in France, with the Collection Nationale de Cultures de Microorganismes [National Collection of Microorganism Culture] of the Institut Pasteur under No. CNCM I-4469).

The fermentation was in this case carried out in two prior successive preculturing phases before the actual culturing/production phase in a 20 l reactor.

For this experiment, vitamins were added into the first preculture medium, but the addition of vitamins to the second preculture medium and in production was optional.

The preculture media therefore had the composition presented in the following Tables I and II:

TABLE I

| Medium for the first preculture | % |
|---|---|
| Glucose | 3 |
| Yeast extract | 0.4 |
| Sodium glutamate | 6.42 |
| NaCl | 1.25 |
| $MgSO_4$ | 0.4 |
| KCl | 0.05 |
| $CaCl_2$ | 0.01 |
| $NaHCO_3$ | 0.05 |
| $KH_2PO_4$ | 0.4 |
| Vitamin mixture | 0.14 |
| Trace elements | 0.8 |

TABLE II

| Medium for the second preculture | % |
|---|---|
| Glucose | 8.57 |
| Sodium glutamate | 6.42 |
| Yeast extract | 0.64 |
| NaCl | 2 |
| $KH_2PO_4$ | 0.64 |
| $MgSO_4$ | 2.29 |
| $CaCl_2$ | 0.03 |
| $NaHCO_3$ | 0.03 |
| $Na_2SO_4$ | 0.03 |
| Vitamin mixture | 0.14 |
| Trace elements | 0.2 |

Generally, Clerol "FBA3107" antifoam was used at 1 ml/l. Optionally, 50 mg/l of penicillin G sodium salt were used in order to prevent the growth of contaminating bacteria.

The glucose was sterilized with the KH2PO4 and separately from the rest of the medium since the formation of a precipitate (ammonium-phosphate-magnesium) was thus avoided. The vitamin mixture and the trace elements were added after sterilizing filtration. The composition of the culture/production medium is given by the following Table III.

TABLE III

| | % |
|---|---|
| Glucose addition at T0 | 7.5 |
| Urea | 1 |
| Yeast extract | 1.2 |
| NaCl | 0.25 |
| $KH_2PO_4$ | 0.96 |
| $MgSO_4$ | 1.2 |
| $CaCl_2$ | 0.12 |
| $NaHCO_3$ | 0.12 |
| KCl | 0.08 |
| Addition of the vitamin mixture | 0.4 |
| Trace elements | 0.56 |

The composition of the vitamin mixtures and of the trace elements is given in the following Tables IV and V:

TABLE IV

| Vitamin mixture | g/l |
|---|---|
| B1 | 45 |
| B6 | 45 |
| B12 | 0.25 |

TABLE V

| Trace elements | g/l |
|---|---|
| $MnCl_2 \cdot 2H_2O$ | 8.60 |
| $CoCl_2 \cdot 6H_2O$ | 0.2 |
| $NiSO_4 \cdot 6H_2O$ | 7.50 |
| $Na_2MoO_4 \cdot 2H_2O$ | 0.15 |
| $ZnSO_4 \cdot 7H_2O$ | 5.70 |
| $CuSO_4 \cdot 5H_2O$ | 6.50 |
| $FeSO_4 \cdot 7H_2O$ | 32.00 |
| $ZnCl_2$ | 1.50 |

Preculturing Conditions

The first preculture was prepared in a baffled 500 ml Erlenmeyer flask to which a drop of Clerol FBA 3107 antifoam sold by the company Cognis GmbH Dusseldorf was added.

The culture medium was filtered after complete dissolution of its constituents, and optionally supplemented with penicillin G sodium salt in a proportion of 0.25 mg/l.

The inoculation was carried out by sampling of colonies of microalgae cultured in a Petri dish (in a proportion of one 10 µl loop).

The incubation lasted 24 to 36 hours, at a temperature of 28° C., with shaking at 100 rpm (on an orbital shaker).

Since the biomass settles out (or adheres to the wall), great care was taken to remove 3 to 5 ml after having thoroughly shaken the Erlenmeyer flask.

For the second preculture, baffled 2 l Erlenmeyer flasks fitted with tubes were used.

A drop of antifoam and the yeast extract were added to 100 ml of water.

All of the constituents of the medium were filtered after dissolution in 300 ml of demineralized water. It was optionally possible to add penicillin G sodium salt and, to the Erlenmeyer flask, a drop of antifoam before its sterilization.

The inoculation was subsequently carried out with 3 to 5 ml of the first preculture.

The incubation was carried out at 28° C. for a further 24 to 36 hours, with shaking at 100 rpm.

Production in a 20 l Reactor

The actual culturing was carried out in the following way in a 20 l reactor:

sterilization of a part of the medium in the reactor, with the other part being sterilized separately so as to avoid the formation of a precipitate, inoculation carried out using the biomass produced at the end of the second preculturing in a proportion of 0.5% v/v of the culture medium, culture maintained at 30° C., oxygen transfer rate fixed at 35-40 mmol/l/h, aeration from 0.2 to 0.3 VVM, initial pH>5.5, and glucose supplied as soon as the concentration is >20%, so as to maintain a glucose concentration of between 15 and 70 g/l.

The following Table VI presents the results obtained with the *Schizochytrium* sp. of the applicant company.

TABLE VI

| Tests | E |
|---|---|
| Preculture temperature (° C.) | 28 |
| Culture temperature (° C.) | 30 |
| Squalene titer at end of culture (g/l) | 4.4 |
| Biomass (g/l) | 54 |
| g/100 g of squalene relative to dry biomass | 8.2 |

Biomass Recovery

The biomass extracted from the fermenter is washed to remove the interstitial soluble material via a succession of two series of concentration by centrifugation (5 minutes at 5000 g) and dilution of the biomass (in a proportion of ⅓ Vpellet/Vwater).

The dry cell concentration relative to the total crude dry matter is 95%.

The dry matter is then adjusted to 12%.

Obtaining the Crude Oil

The washed biomass is stirred in a laboratory reactor of 2 l fermenter type (such as those sold by the company Interscience) equipped with a marine impeller and baffles.

This system makes it possible to limit the emulsification of the cell lysate generated while at the same time allowing good mixing which is essential for the action of the lytic enzyme.

The temperature is adjusted to 60° C. and the pH is regulated at approximately 8 with sodium hydroxide.

These conditions are optimal for the activity of the alcalase enzyme (Novozymes) added in an amount of 1% on a dry weight basis.

The lysis time is fixed at 4 h.

At the end of lysis, 10% of ethanol ($V_{ethanol}/V_{lysate}$) are added to the reaction mixture (oil-in-water emulsion) kept stirring for a further 15 min.

A crude oil containing about 35% by weight of DHA and about 15% by weight of squalene is then obtained.

EXAMPLE 2

Enrichment of an Oil with Ethyl Esters of DHA by Molecular Distillation

An oil from *Schizochytrium* sp. algae, produced from *Schizochytrium* algae cultured in a 1 m³ fermenter according to operating conditions extrapolated from those of example 1, is used.

The triglyceride fraction has the following fatty acid profile:

| Nomenclature | Fatty acid profile oil (% area relative to tFA)** |
|---|---|
| C14 | 7.6 |
| C16 | 20 |
| Osbond | 15.3 |
| DHA | 40.2 |
| Others | 16.9 |
| Total | 100 |

**percentage of the compound relative to the total fatty acid fraction (surface distribution by GC)

The unsaponifiable fraction essentially consists of squalene (~21.8%/crude).

Step 1: Treatment of the Crude Oil for the Purpose of Removing the Squalene

A VTA VK 83-6-SKR-T Short Path Distillation unit is used.

From the nitrogen-inerted feed reservoir, 8 kg of oil are pumped at 3.5 kg/h to the degasser at a temperature of 120° C.

At the outlet of the degasser, the oil passes through the "short path" evaporation chamber through a circuit maintained at 120° C.

The temperature of the evaporator is adjusted to 220° C.

The condenser is set to a temperature of 20° C. The vacuum in the evaporation chamber is as high as possible ($<10^{-3}$ mbar).

The distillate containing the squalene and the residue containing the triglycerides are conveyed via the collecting circuits to the inerted storage tanks.

At this stage, approximately 1.5 kg of distillate and 6 kg of residue are recovered.

The squalene content in the distillate is equal to 94%. The squalene content of the residue is less than 2%.

Step 2: Transesterification of the Treated Oil

The transesterification is carried out batchwise using 6 kg of residue from step 1. The reaction is carried out at 50° C. in a nitrogen-inerted, closed, stirred, jacketed reactor with 600 g of Novozym 435 and 680 g of absolute ethanol.

The reaction mixture is maintained under these conditions for 8 h.

At the end of the reaction, the enzyme is separated by filtration on a 10 μm nylon cloth. The filtrate is centrifuged (5 min at 10 000 G) in order to remove the glycerol. Approximately 6 kg of an oil, the triglyceride fraction of which has been 90% converted into ethyl esters, are recovered.

The composition is the following:

| Nomenclature | g/100 g crude* | % area relative to tFA** |
|---|---|---|
| C14 | 7 | 7.7 |
| C16 | 16.6 | 18.2 |
| Osbond | 12.9 | 14.5 |
| DHA | 33.6 | 38 |
| Others | 19.3 | 21.6 |
| Total | 89.4 | 100 |

*weight percentage of the compound in the crude mixture
**percentage of the compound relative to the ethyl ester fraction (surface distribution by GC)

Step 3: Fractionation of the Esters

A VTA VK 83-6-SKR-T Short Path Distillation unit is used.

From the nitrogen-inerted feed reservoir, 6 kg of the conversion product obtained in step 2 are pumped at 1 kg/h to the degasser at a temperature of 100° C.

At the outlet of the degasser, the ethyl esters pass through the "short path" evaporation chamber through a circuit maintained at 85° C.

The temperature of the evaporator is adjusted to 110° C.

The condenser is set to a temperature of 20° C. The vacuum in the evaporation chamber is as high as possible ($<10^{-3}$ mbar).

The distillate containing the short-chain (predominantly C14 and C16) ethyl esters and the residue containing the long-chain fatty acid ethyl esters are conveyed via the collecting circuits to the inerted storage tanks.

At this stage, approximately 2.6 kg of distillate and 3.6 kg of residue are recovered.

The ethyl ester compositions are the following:

| | FEEDSTOCK | | Distillate | | Residue | |
|---|---|---|---|---|---|---|
| Nomenclature | g/100 g crude * | % area relative to tFA** | g/100 g crude * | % area relative to tFA** | g/100 g crude * | % area relative to tFA** |
| C14 | 7 | 7.7 | 15.9 | 16.3 | 0 | 0 |
| C16 | 16.6 | 18.2 | 40.1 | 41.2 | 1.6 | 1.8 |
| Osbond | 12.9 | 14.5 | 5.9 | 6 | 20.3 | 22.8 |
| DHA | 33.6 | 38 | 14.2 | 14.6 | 53.9 | 60.6 |
| Others | 19.3 | 21.6 | 21.2 | 21.9 | 9.3 | 14.8 |
| Total | 89.4 | 100 | 97.3 | 100 | 85.1 | 100 |

* weight percentage of the compound in the crude mixture
**percentage of the compound relative to the ethyl ester fraction (surface distribution by GC)

The DHA yield from the separation described in this step is approximately 84% (relative to the loss of DHA in the distillate).

Step 4: Purification of the Esters:

A VTA VK 83-6-SKR-T Short Path Distillation unit is used.

From the nitrogen-inerted feed reservoir, 3.6 kg of ethyl esters are pumped at 5 kg/h to the degasser at a temperature of 100° C.

At the outlet of the degasser, the ethyl esters pass through the "short path" evaporation chamber through a circuit maintained at 85° C.

The temperature of the evaporator is adjusted to 200° C.

The condenser is set to a temperature of 20° C. The vacuum in the evaporation chamber is as high as possible ($<10^{-3}$ mbar).

The distillate containing the PUFA ethyl esters and the residue containing the impurities are conveyed by the collecting circuits to the inerted storage tanks.

At this stage, approximately 2.9 kg of distillate and 0.4 kg of residue are recovered.

The ethyl ester compositions are the following:

| | FEEDSTOCK | | Distillate | | Residue | |
|---|---|---|---|---|---|---|
| Nomenclature | g/100 g crude * | % area relative to tFA** | g/100 g crude * | % area relative to tFA** | g/100 g crude * | % area relative to tFA** |
| C14 | 0 | 0 | 0 | 0 | 0 | 0 |
| C16 | 1.6 | 1.8 | 1.8 | 1.8 | 0.2 | 1 |
| Osbond | 20.3 | 22.8 | 22.5 | 22.9 | 5.6 | 24 |
| DHA | 53.9 | 60.6 | 59.4 | 60.5 | 14.8 | 63.7 |
| Others | 9.3 | 14.8 | 10.2 | 14.8 | 2.7 | 11.3 |
| Total | 85.1 | 100 | 93.9 | 100 | 23.3 | 100 |

* weight percentage of the compound in the crude mixture
**percentage of the compound relative to the ethyl ester fraction (surface distribution by GC)

The DHA yield from the separation described in this step is approximately 97% (relative to the loss of DHA in the distillate).

The invention claimed is:

1. A process for preparing an oily composition enriched with ethyl esters of docosahexaenoic acid (DHA) from a fermentation broth produced by microalgae belonging to the family *Thraustochytriales*, the process comprising the steps of:
   1) preparing a crude oil containing a mixture of DHA-rich triglycerides and unsaponifiable compounds composed essentially of squalene, from a fermentation broth of microalgae of the *Thraustochytriales* family,
   2) optionally refining the resulting crude oil by a series of degumming, deacidifying, discoloring and deodorizing steps,
   3) extracting the squalene from the crude oil by "short path" molecular distillation so as to obtain a raffinate devoid of squalene,
   4) transesterifying the resulting raffinate by alcoholic transesterification in the presence of a basic or enzymatic catalyst,
   5) fractionating the mixture of fatty acid esters in step 4) by "short path" molecular distillation, so as to obtain an extract rich in short-chain fatty acid esters and a raffinate rich in long-chain fatty acid esters,
   6) purifying the mixture of long-chain fatty acid esters obtained during step 5) by "short path" molecular distillation, so as to obtain an extract enriched in long-chain esters, devoid of impurities,
   7) optionally, refining this extract enriched in long-chain esters by a series of discoloring and deodorizing steps, and
   8) recovering the resulting oily composition enriched with ethyl esters of DHA.

2. The process of claim 1, wherein the molecular distillation steps are carried out under a high vacuum, at a value of less than 0.1 mbar.

3. The process of claim 1, wherein the "short path" refers to a contacting time of less than 1 minute.

4. An oily composition enriched with ethyl esters of docosahexaenoic acid obtainable by the process as defined in claim 1.

5. The oily composition of claim 4, said composition being suitable for use in food sectors.

6. The process of claim 1, wherein the microalgae belonging to the family *Thraustochytriales* is of the species *Schizochytrium* sp., *Aurantiochytrium* sp. or *Thraustochytrium* sp.

7. The process of claim 1, wherein the temperature of the evaporator in step 3) is from 200° C. to 240° C.

8. The process of claim 1, wherein the temperature of the evaporator in step 5) is from 100° C. to 150° C.

9. The process of claim 1, wherein the temperature of the evaporator in step 6) is from 180° C. to 220° C.

* * * * *